Feb. 8, 1949.  B. E. JONES ET AL  2,461,424
VEHICLE HEATING ARRANGEMENT
Filed March 25, 1946  6 Sheets-Sheet 1

Inventors:
Basil E. Jones &
Joseph R. Stanley:
By Oscar Hochberg,
Atty.

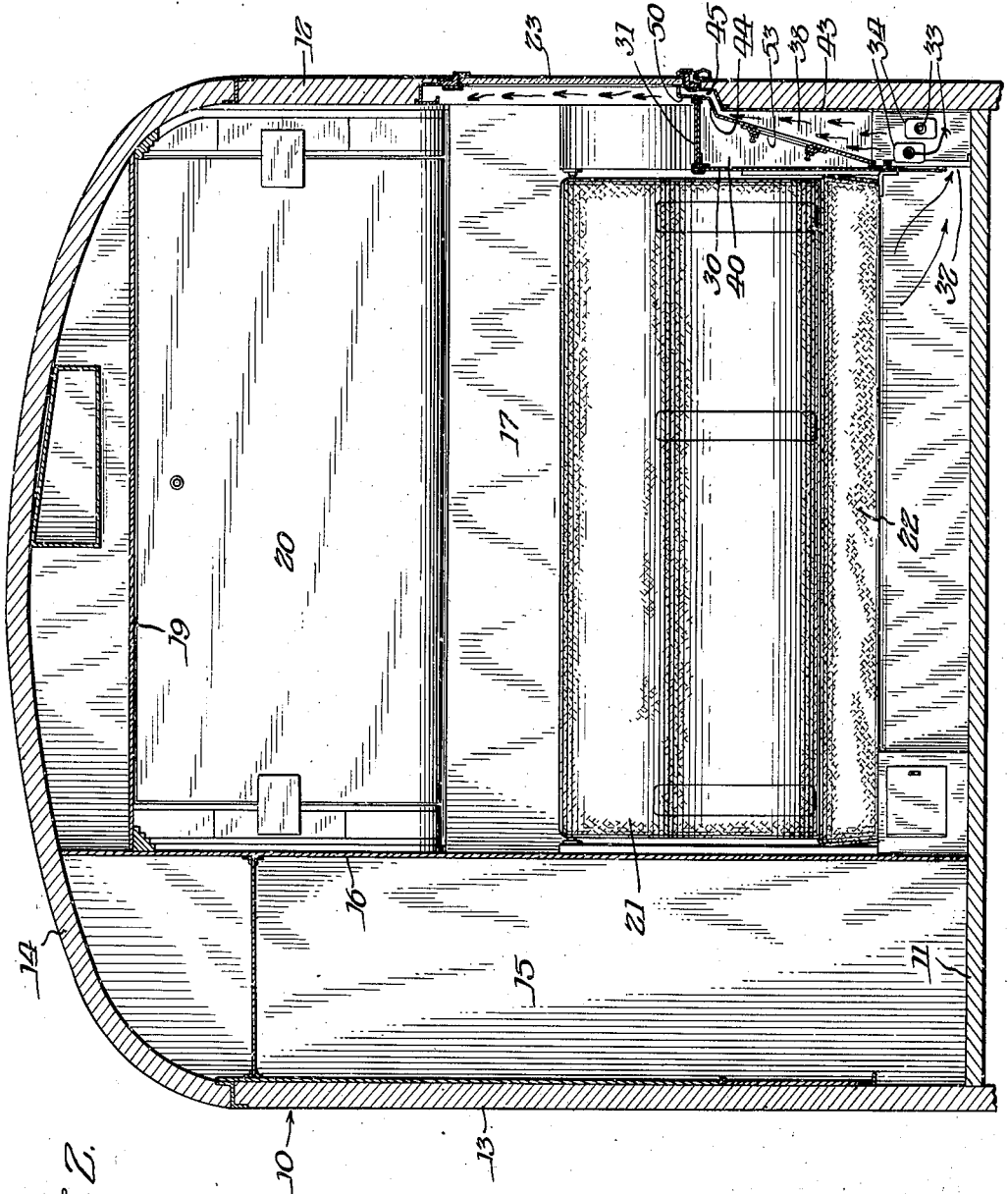

Feb. 8, 1949.  B. E. JONES ET AL  2,461,424
VEHICLE HEATING ARRANGEMENT
Filed March 25, 1946  6 Sheets—Sheet 3
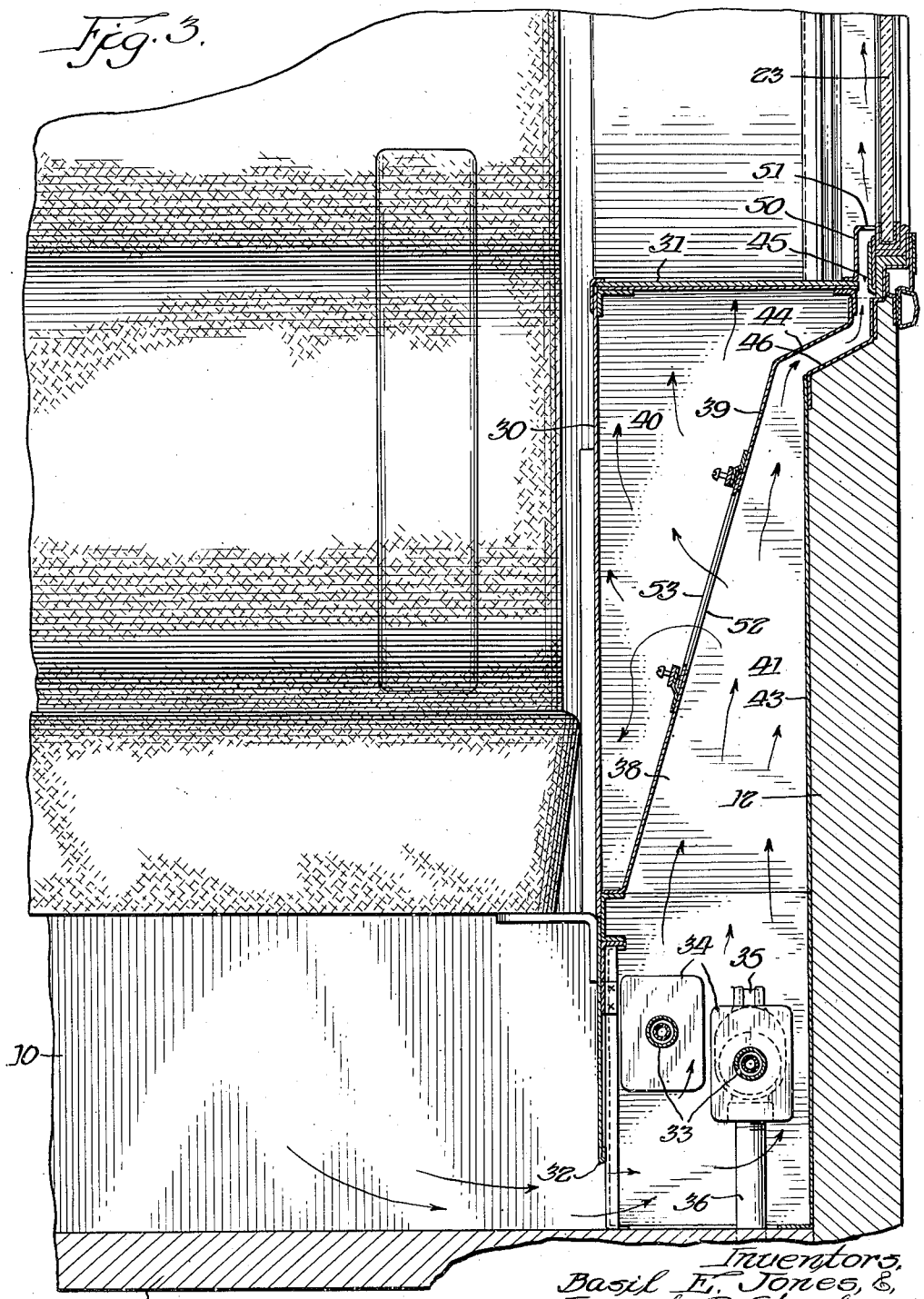
Inventors,
Basil E. Jones, &
Joseph R. Stanley
By: Oscar Hochberg Atty.

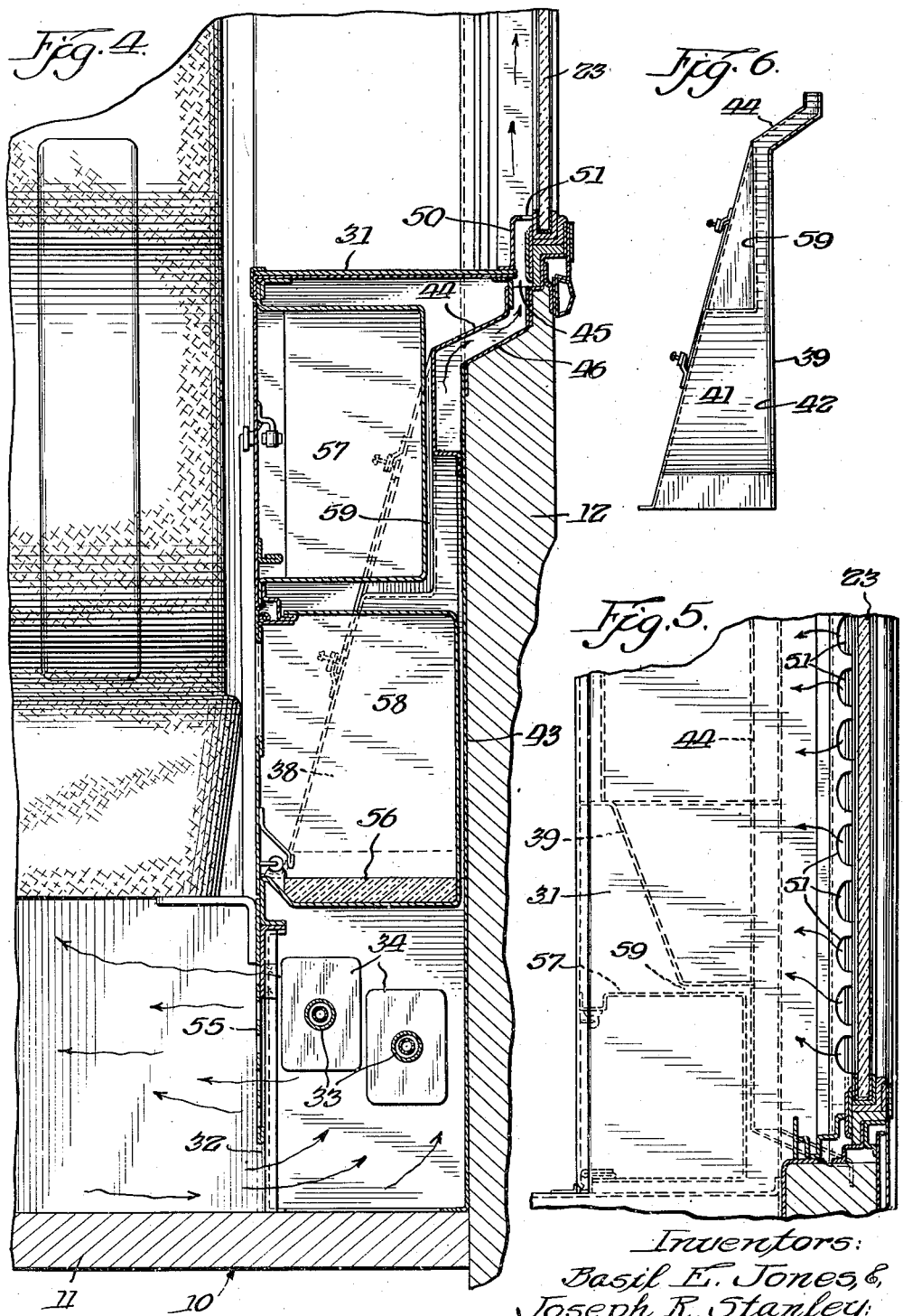

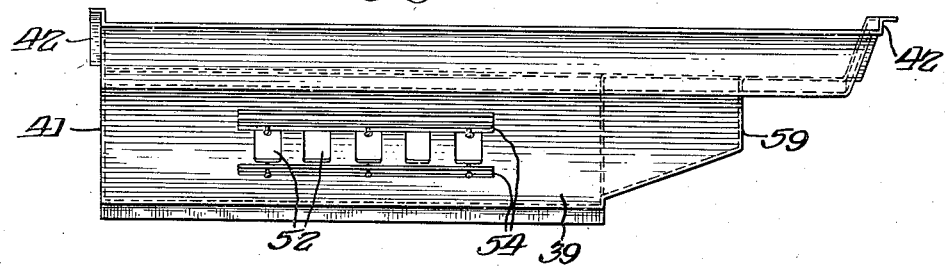
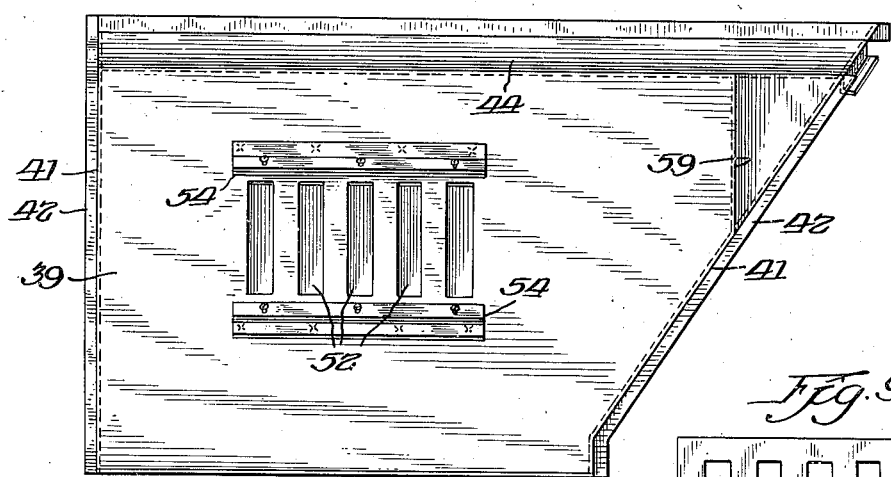
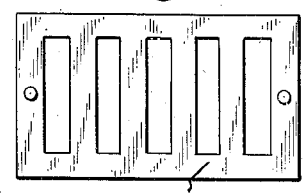
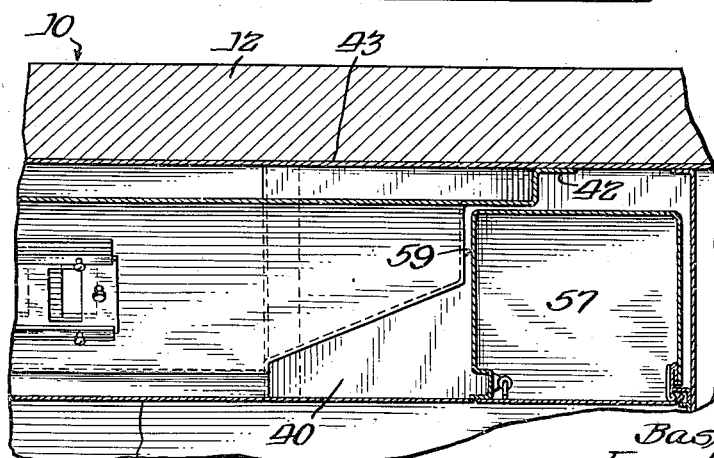

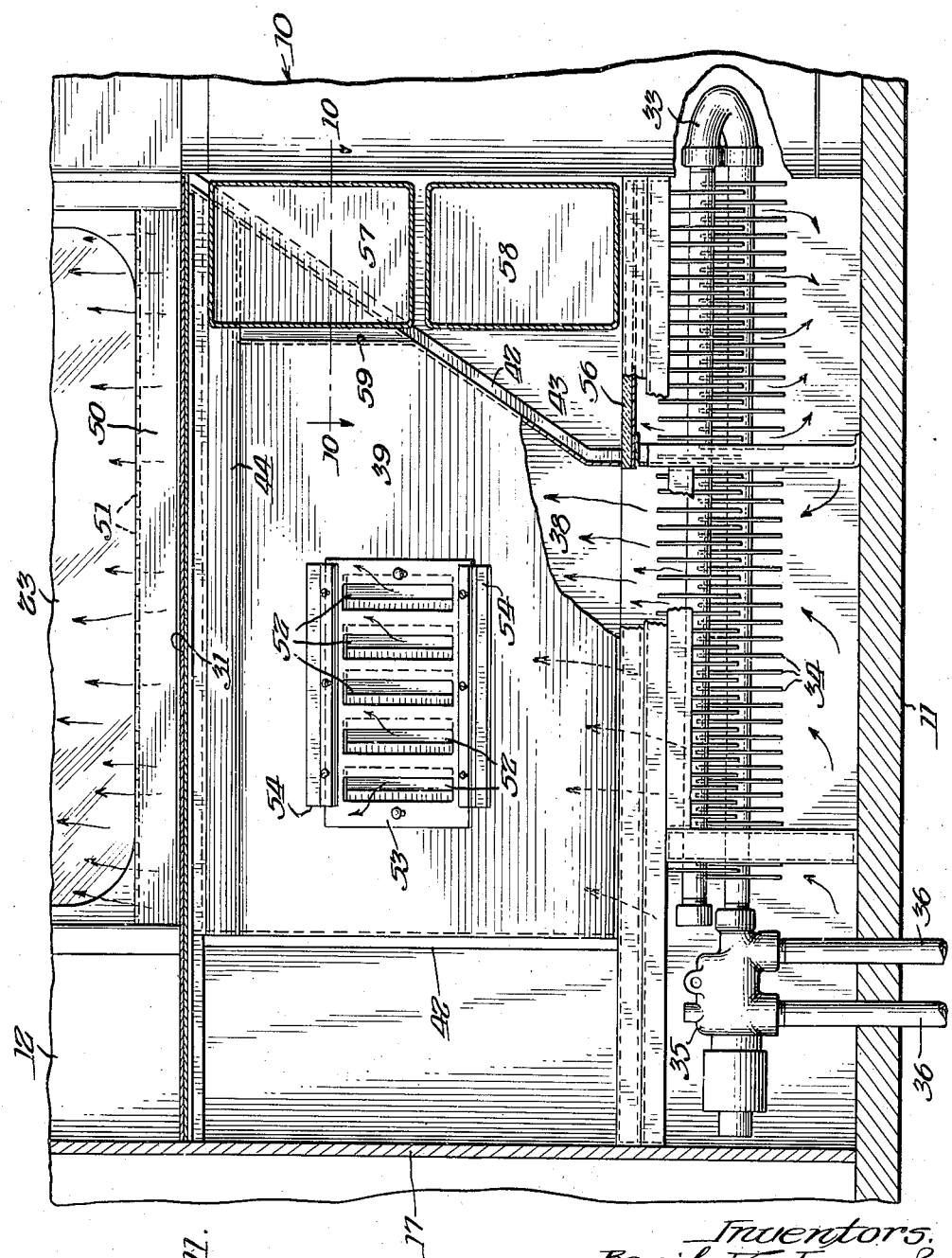

Patented Feb. 8, 1949

2,461,424

UNITED STATES PATENT OFFICE 2,461,424

VEHICLE HEATING ARRANGEMENT

Basil E. Jones, Flossmoor, and Joseph R. Stanley, Chicago, Ill., assignors to The Pullman Company, Chicago, Ill., a corporation of Illinois Application March 25, 1946, Serial No. 656,821

7 Claims. (Cl. 237—40)

This invention relates to a heating system for railway passenger cars and more particularly for such cars having individual accommodations in the form of private or semi-private rooms.

The primary object of the invention is the provision of a heating arrangement for a room including a panel providing radiant heat for general warmth.

Another object of the invention lies in the provision of a heating arrangement having a radiant heat panel for general heating in combination with an auxiliary heater for directly heating the floor area and serving as a foot warmer.

A further and important object of the invention comprises the provision of a heating arrangement for a vehicle including a radiant heat panel beneath a window in combination with means for providing a warm air curtain over the window area to prevent the radiation of cold air normally emanating from a cold glass area of this kind.

A still further object of the invention is realized in the combination of the radiant heating panel beneath a window with means providing a warm air current over the entire area of the window and an auxiliary heater for direct heating of the floor area, all heated from the same source of heat.

The foregoing and other objects of the invention are attained by the construction and arrangement illustrated in the accompanying drawings, in which Fig. 1 is a general side elevational view of a room of the type used in railway cars and known as a bedroom and incorporating the heating arrangement of this invention with the radiant heat panel at the end of the convertible sofa-seat adjacent the side wall with the foot warming heater in front of and beneath the level of the seat adjacent the floor and indicating the hot air curtain in the window area;

Fig. 2 is a general transverse sectional view through a vehicle showing a bedroom equipped with this heating system and illustrating the heating arrangement in cross section with the radiant heat panel next to the seat end and the hot air chimney or flue restricted at the upper end to provide a throat next to the window through which the jet comprising the air curtain is ejected, and showing the adjustable opening in the one wall of the chimney communicating with the chamber behind the radiant panel for heating the panel;

Fig. 3 is a fragmentary cross sectional view to larger scale through the side wall and heating installation taken on the line 3—3 of Fig. 1 and showing the arrangement of the hot air chimney to provide a flue effect with the room air being drawn in at the bottom and passing over the finned heating coil to provide a thermal up-draft in the chimney and clearly revealing the function of the restricted upper portion of the chimney in building up a pressure in the flue to cause the hot air to issue from the narrow throat in the form of a jet affording an air curtain over the entire window area and showing the chimney communicating with the radiant heat panel chamber for heating the panel;

Fig. 4 also is a fragmentary cross sectional view to larger scale through the side wall and heating installation taken on the line 4—4 of Fig. 1 but showing the direct heating foot warmer adjacent the floor heated by the same heating coil as in the air curtain flue and showing a part of the flue in that upper flared portion of the chimney above the floor heater;

Fig. 5 is a fragmentary top plan view of the heating arrangement installation showing the restricted air outlets providing the jets affording an air curtain over the window;

Fig. 6 is a detail view of the air curtain flue forming member from one side, shown from that side incorporating the flare accommodating the flue to the full width of the window and having portions shaped to accommodate receptacles adjacent thereto in the wall;

Fig. 7 is a similar detail view of the flue forming member but showing it as viewed in plan in its operative position and clearly revealing the offset portion at the flared end of the member for accommodating one of the receptacles in the side wall;

Figure 1:
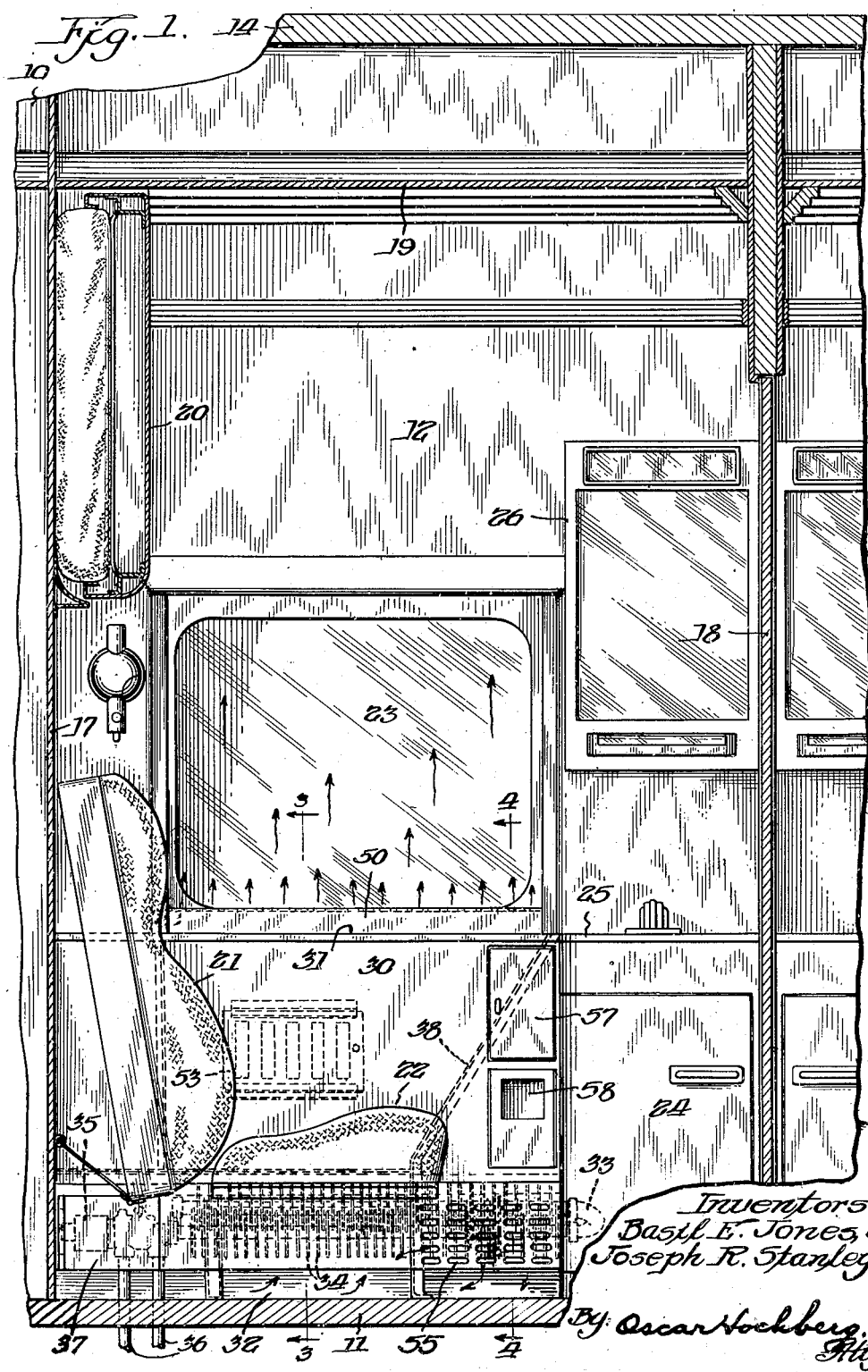

Fig. 8 also is a detail view of the flue forming member showing it in front elevation, clearly revealing the upward flared construction of the member and showing the openings for feeding heated air to the radiant heat panel chamber with adjacent slides for guiding an adjustable closure member associated with the openings;

Fig. 9 is a detail view of the closure member adapted to be used with the openings in the flue member shown in Fig. 8 to adjust the openings to the flow of air required for proper heating of the radiant panel;

Fig. 10 is a detail plan sectional view taken on the line 10—10 of Fig. 11 illustrating a section through that portion of the air flue adjacent the offset for the receptacles in the side wall behind the radiant heat panel showing the interfitting relation of the uppermost receptacle with respect to the offset; and Fig. 11 is an elevational view of the heating arrangement with the radiant heat panel removed to show the relation of the various components of the system including the primary source of heat comprising the finned heating pipe coil which supplies heated air to the hot air flue leading to the air curtain emission openings at the window and feeds a portion of such air through the adjusted grille openings to the radiant heat panel chamber and also comprises the source of heat for the direct heating foot warmer at the floor.

The heating arrangement of this invention contemplates three important functions which operate individually to increase the efficiency of the system as a whole and in combination serve materially to improve the general comfort conditions in the area heated. The first of these functions comprises the general heating of the room air by radiant panel heating to provide comforting warmth without drafts or overheated areas in one portion of the room while another portion may remain relatively unheated. The second function consists of providing a sheet or curtain of warm air over the entire area of the window to prevent the radiation of cold air which normally emanates from this source. The third function referred to embraces the direct heating floor grille for warming the air at the passengers' feet and which combines with the radiant panel and air curtain to create the most desirable comfort conditions in the room.

As shown in the drawings, the invention is revealed as installed in a railway sleeping car accommodation of the type known as a bedroom but as shown in prior application Serial No. 624,641, filed October 26, 1945, by Basil E. Jones, for Vehicle room and berth arrangement, the invention is fully disclosed as applied in a sleeping car accommodation of the type known as a compartment, and other than the adaptation of the arrangement to a room of less area, it will be seen that the arrangement is the same.

In the drawings, 10 represents a railway car having a floor 11, side walls 12 and 13 and a roof 14. An aisle 15 extending longitudinally of the car is defined by a passageway partition 16. Extending transversely of the car between the side wall 12 and passageway partition 16, dividing partitions 17 and 18 define a bedroom having a ceiling 19. The bedroom contains a hingedly mounted and foldable plane-faced upper berth 20, disposed flush with adjoining wall areas on the partition 17 and a convertible sofa-bed 21 having a seat portion 22. Both of these facilities extend substantially between passageway partition 16 and side wall 12 and when disposed for sleeping, above and below the window 23 in the side wall. The sleeping facilities are both disposed at that side of the room adjacent partition 17 and at the other side of the room in the corner formed by partition 18 and side wall 12, toilet facilities are provided in the form of a tilting hopper arrangement enclosed in a built-in cabinet 24, including a fixed covered washbasin 25 and a medicine cabinet 26 having a mirror door including built-in lighting fixtures. The bedroom is entered from the aisle 15 by means of an entrance door in the passageway partition 16, all as in customary practice and as disclosed in the co-pending application above referred to.

The side finish on car wall 12 above the window 23 is substantially conventional for accommodations of the type disclosed, but below the window the side finish departs from the usual practice in that the wainscoting is built out from the wall 12 a substantial distance to provide a panel 30 extending in a single plane from the cabinet 24 to the partition 17 and extending to the window capping 31 at the level of the belt rail and disposed adjacent to the end of seat 22. This arrangement of the wainscoting accommodates the entire heating system in all of its particulars in the space between the wainscoting and side wall structure 12 and beneath the capping 31 closing the space at the top. It will be noted that the window capping is disposed on a level with the surface of the cover over the wash-basin 25 so that a continuous surface is provided extending from the partition 18 to the wall finish disposed flush with the sofa 21.

The wainscoting panel 30 at its lower edge is spaced from the floor 11 as at 32 to provide an air passage communicating with the space behind the panel. Immediately above the opening 32 and behind the wainscoting a heater pipe coil 33 is disposed in the path of the air stream entering the heating space. This pipe coil has fins 34 for greater heat radiation and extends from an automatically functioning valve 35 at one end to a point within the cabinet 24 and return. The valve 35 is connected to the main train line (not shown) which provides a source of steam and to a vapor regulator by means of supply and drain pipes 36 and is controlled by means of manually operated controls in the room and forming no part of this invention. All air entering through the opening 32 into the space behind the wainscoting panel must pass over the coil 33 and is heated thereby. The control valve 35 behind the wainscoting is made easily accessible for servicing and maintenance by means of a hinged access door 37, as best shown in Fig. 1.

The space behind the wainscoting panel 30 is designed to provide a hot air flue in the form of a tapered and flared chimney 38 extending from immediately above the heater pipe coil through the window capping 31 immediately adjacent the window 23. A pressed plate 39, best shown in detail in Figs. 6, 7 and 8, forms this flue, and as best shown in Fig. 3, this plate slopes from a point adjoining the inner side of the wainscoting at the base of the chimney toward the side wall 12 just below the window to divide the space behind the wainscoting into separate compartments comprising the flue 38 and a chamber 40 immediately behind the wainscoting. The plate 39 is pressed to provide side wall portions 41 closing the sides of the chimney and which are adapted to be secured to the inside face of wall 12 by means of flanges 42. A plate 43 covers the inside face of the side wall and lines the entire space behind the wainscoting, and it is against this plate that the flanges 42 bear for attachment to the side wall, and therefore the plate provides the inside lining of the hot air flue 38 at the side wall.

The flue 38 tapers from a dimension at its bottom substantially full width of the space behind the wainscoting to a narrow throat at its top providing a restricted emission opening for issuing the hot air in the form of a jet. As best shown in Fig. 11, the flue 38 also flares from a base portion of less length than the full extent of the heater coil 33 to the restricted outlet portion at its top extending full width of the window 23 to provide means for directing a sheet or curtain of hot air over the entire area of the window. The sloping plate 39 below the window capping 31 is offset at 44 in order to locate the restricted throat 45 in a plane immediately adjoining the window 23 and a separate plate 46, complemental to this offset portion in the side wall area, extends from the top of the inside wall plate 43 to the window sill to provide a rear wall for the hot air flue at this point. Above the window capping 31 a plate 50 in the form of a molding at the bottom of the window forms a continuation of the restricted throat 45 and is provided with a plurality of closely adjacent emission openings 51 directing the stream of hot air issuing from the flue directly over the window to prevent transmission of cold from the outside through the window directly to the room interior. It will be seen that air drawn from the room through opening 32 at the floor passes over the finned heating pipes 33 to enter the flue 38 which acts somewhat as a chimney to create a positive and constant circulation of air through the floor opening, over the heating pipes, through the air flue, which, due to its tapered and flared construction causes the air to fan out and be ejected from the emission openings 51 in the form of a continuous jet, providing a heated curtain of air over the entire window area to prevent any possibility of persons in the room being conscious of the cold air which otherwise would normally emanate from the window.

The wainscoting 30 is utilized for general comfort heating of the bedroom and is heated from the hot air flue 38 to serve as a radiant heating panel to maintain the temperature of the room at a normal and comfortable level without noticeable drafts. The radiant heat panel is heated to the temperature of the air in chamber 40 since it is in direct contact therewith, and the air in chamber 40 is heated by contact with the chimney 39 and by circulation of air from the hot air flue into the radiant panel heating chamber so that the current of air passing over the finned heating coils 33, through the chimney, to provide the hot air jet over the window, also serves to heat the radiant heat panel. In order to provide hot air from the flue 38 to heat chamber 40, the sloping plate 39 is provided with a series of aligned openings 52 affording direct communication between the hot air flue and the panel heating chamber. A louvered shutter member 53 is associated with the openings 52 to provide means for adjusting the openings to control the amount of heated air passing into the chamber. The shutter member is mounted in guides 54 for sliding movement in directions to regulate the size of the communicating openings in accordance with the heat required in chamber 40 to meet the requirements necessary to the proper heating of the room through the medium of panel 30. This adjustment is initially made at the time of installation, and the heating requirements once having been determined, it ordinarily will not be necessary to disturb the adjustment in the normal use of the arrangement thereafter. It is to be noted that the same source of heat is utilized for providing the hot air stream over the window and for heating the panel 30 and that the one is heated directly by the other. However, while the panel heating chamber 40 has been shown as intervening between the radiant heating panel and the hot air flue 38, the system might be so arranged as to have the chimney wall 39 serve directly as the radiant heat panel should conditions warrant, and in which event the louvered shutter openings 52 necessarily would be eliminated. Where the heating requirements of a room do not require the higher temperature achieved by directly circulating hot air from the flue 38 into the chamber 40, the louvered openings 52 may be omitted and the radiation of wall 39 relied upon to heat the chamber 40 without benefit of any direct air circulation to increase the operating temperature of the radiant panel 30.

As best shown in Fig. 11, it will be seen that the major portion of the heating pipe coil 33 is utilized in heating the air entering the hot air flue 38, but a portion of the coil extending beyond the base of the air flue is utilized as a foot warmer in heating the floor area of the room adjacent to the seat 22. As shown in Figs. 1 and 4, a grille 55 covers the foot warming heater which is disposed beneath the flared portion of the hot air flue and arranged flush with the surface of the panel 30. This heater chamber, behind the grille 55, is insulated from the space thereabove behind the wainscoting by means of insulation 56 so that all of the heat radiated by this portion of the heater pipe coil is given off directly to the floor area. The grille stops short of the floor similar to the wainscoting panel 30 so that the floor opening 32 extends also beneath the grille portion, and in operation, air is drawn into the heater chamber from adjacent the floor through the opening 32 and is heated in its circulation over the finned pipes 33 and returned through the grille 55 directly to the floor area to warm the feet of passengers using the seat 22.

The space behind the wainscoting 32 above the direct heating floor heat chamber and adjacent to the cabinet 24 housing the fixed washbasin is utilized for the accommodation of receptacles 57 and 58 which are accessible through the wainscoting from the room. These receptacles are adapted for the storage of clean towels and to receive soiled towels, respectively, and for this purpose are located next to the washbasin 25. In order to accommodate the clean towel receptacle 57, the upper flared portion of the hot air flue 38 is shaped to receive the towel receptacle without restricting the width of the outlet or throat 45 so that the air curtain is maintained full width of the window 23. To accomplish this, the sloping plate 39 is recessed, as at 59, and the towel receptacle is fitted directly into this space with the uppermost flared portion of the hot air flue extending behind the towel receptacle to the full extent of the outlet plate molding 50 which is coextensive with the window.

From the foregoing it will be seen that there has been provided a heating arrangement for the individual rooms of a vehicle in which a radiant panel heating system has been combined with a hot air curtain at the window and a direct heating foot warmer at the floor level, all utilizing the same source of heat, to the general increase in comfort heating of the respective rooms.

What is claimed is:

1. In a railway vehicle having a side wall, a room in the vehicle having a floor, a window for the room located in said side wall, a heating system for the room including a source of heat comprising a heating pipe coil disposed adjacent to said floor next to the side wall, a radiant heating panel spaced from the side wall beneath said window and enclosing said heating pipe coil, a radiant panel heating chamber behind said panel, a hot air flue behind said chamber having a base portion substantially full width of the space between the radiant panel and side wall and extending upwardly to a restricted outlet adjoining the window, a partition separating said heating chamber and air flue, a plate member defining the rear wall of said flue, an opening to the hot air flue beneath said heating pipe coil to create a circulation of air over the coil, through the flue, and issuing from the outlet under said window, said panel heating chamber being heated from the hot air flue by means of a communicating opening therebetween, adjustable means controlling said opening for regulating the circulation of hot air into said chamber, and a floor heating chamber including an air outlet grille substantially flush with the radiant panel and an air inlet opening beneath the grille for the admission of air circulating over said heating pipe coil and returned to the room through said grille, said hot air flue, panel heating chamber and floor heating chamber all being heated from said source of heat.

2. In a railway vehicle having a side wall, a room in the vehicle having a floor, a window for the room located in said side wall, a heating system for the room including a source of heat comprising a heating pipe coil disposed adjacent to said floor next to the side wall, a radiant heating panel spaced from the side wall beneath said window and enclosing said heating pipe coil, a radiant panel heating chamber behind said panel, a hot air flue behind said chamber having a base portion substantially full width of the space between the radiant panel and side wall and extending upwardly to a restricted outlet adjoining the window, a partition separating said heating chamber and air flue, a plate member defining the rear wall of said flue, an opening to the hot air flue beneath said heating pipe coil to create a circulation of air over the coil, through the flue, and issuing from the outlet under said window, said panel heating chamber being heated from the hot air flue, and a floor heating chamber including an air outlet grille substantially flush with the radiant panel and an air inlet opening beneath the grille for the admission of air circulating over said heating pipe coil and returned to the room through said grille, said hot air flue, panel heating chamber and floor heating chamber all being heated from said source of heat.

3. In a railway vehicle having a side wall, a room in the vehicle having a floor, a window for the room located in said side wall, a heating system for the room including a source of heat comprising a heating pipe coil disposed adjacent to said floor next to the side wall, a radiant heating panel spaced from the side wall beneath said window and enclosing said heating pipe coil, a hot air flue behind said panel having a base portion substantially full width of the space between the radiant panel and side wall and extending upwardly to a restricted outlet adjoining the window, a partition separating said heating chamber and air flue, a plate member defining the rear wall of said flue, an opening to the hot air flue beneath said heating pipe coil to create a circulation of air over the coil, through the flue, and issuing from the outlet under said window, and a floor heating chamber including an air outlet grille substantially flush with the radiant panel and an air inlet opening beneath the grille for the admission of air circulating over said heating pipe coil and returned to the room through said grille, said hot air flue, radiant panel and floor heating chamber all being heated from said source of heat.

4. In a railway vehicle having a side wall, a room in the vehicle having a floor, a window for the room located in said side wall, a heating system for the room including a source of heat comprising a heating pipe coil disposed adjacent to said floor next to the side wall, a radiant heating panel spaced from the side wall beneath said window and enclosing said heating pipe coil, a radiant panel heating chamber defined in part by said panel and by a rear wall spaced behind said panel, and a floor heating chamber including an air outlet grille substantially flush with the radiant panel and an air inlet opening beneath the grille for the admission of air circulating over said heating pipe coil and returned to the room through said grille, said panel heating chamber and said floor heating chamber both being heated from said source of heat.

5. In a railway vehicle having a side wall, a room in the vehicle having a floor, a window for the room located in said side wall, a heating system for the room including a source of heat comprising a heating pipe coil disposed adjacent to said floor next to the side wall, a wainscoting panel spaced from the side wall beneath said window and enclosing said heating pipe coil, a hot air flue behind said panel having a base portion substantially full width of the space between the panel and side wall and extending upwardly to a restricted outlet adjoining the window, a partition separating said heating chamber and air flue, a plate member defining the rear wall of said flue, an opening to the hot air flue beneath said heating pipe coil to create a circulation of air over the coil, through the flue, and issuing from the outlet under said window, and a floor heating chamber including an air outlet grille substantially flush with the wainscoting panel and an air inlet opening beneath the grille for the admission of air circulating over said heating pipe coil and returned to the room through said grille.

6. In a railway vehicle having a side wall, a room in the vehicle having a floor, a window for the room located in said side wall, a heating system for the room including a source of heat comprising a heating pipe coil disposed adjacent to said floor next to the side wall, a radiant heating panel spaced from the side wall beneath said window and enclosing said heating pipe coil, a radiant panel heating chamber defined in part by said panel and by a rear wall spaced behind said panel, and a floor heating chamber including an air outlet grille and an air inlet opening for the admission of air circulating over said heating pipe coil and returned to the room through said grille, both of said chambers being heated from said coil.

7. In a railway vehicle having a side wall, a room in the vehicle having a floor, a window for the room located in said side wall, a heating system for the room including a source of heat comprising a heating pipe coil disposed adjacent to said side wall, a radiant heating panel beneath said window, a radiant panel heating chamber defined in part by said panel and by a rear wall spaced behind said panel, and a grille defining a floor heating chamber enclosing said heating pipe coil and having an air inlet opening for the circulation of air over the pipe coil and returned to the room through said grille, both of said chambers being heated from said coil.

BASIL E. JONES.
JOSEPH R. STANLEY.

REFERENCES CITED

The following references are of record in the file of this patent:

UNITED STATES PATENTS

| Number | Name | Date |
| --- | --- | --- |
| 1,951,521 | Mussey | Mar. 20, 1934 |